US011100440B1

(12) United States Patent
Davies et al.

(10) Patent No.: US 11,100,440 B1
(45) Date of Patent: Aug. 24, 2021

(54) JUST IN TIME INVENTORY PROCESS AND FULFILLMENT SYSTEM

(71) Applicant: eStack LLC, Seattle, WA (US)

(72) Inventors: Robert Davies, Sammamish, WA (US); Tim Lieberman, Mohegan Lake, NY (US)

(73) Assignee: eStack LLC, Seattle, WA (US)

( * ) Notice: Subject to any disclaimer, the term of this patent is extended or adjusted under 35 U.S.C. 154(b) by 0 days.

(21) Appl. No.: 14/533,618

(22) Filed: Nov. 5, 2014

(51) Int. Cl.
*G06Q 10/08* (2012.01)
*G06Q 10/06* (2012.01)
*G06Q 30/06* (2012.01)

(52) U.S. Cl.
CPC ... *G06Q 10/06315* (2013.01); *G06Q 30/0633* (2013.01)

(58) Field of Classification Search
CPC .............. G06Q 10/087; G06Q 10/04; G06Q 10/06375; G06Q 30/0633
See application file for complete search history.

(56) References Cited

U.S. PATENT DOCUMENTS

| 7,516,083 | B1* | 4/2009 | Dvorak | G06Q 20/203 705/22 |
| 2003/0090509 | A1* | 5/2003 | Tetambe et al. | 345/738 |
| 2005/0150951 | A1* | 7/2005 | Sacco | G06Q 10/087 235/385 |
| 2006/0224439 | A1* | 10/2006 | Smith | G06Q 10/06375 705/7.35 |
| 2009/0125385 | A1* | 5/2009 | Landvater | 705/10 |
| 2015/0032502 | A1* | 1/2015 | Green | G06Q 20/203 705/7.29 |
| 2015/0254290 | A1* | 9/2015 | Lehmann | H04L 67/42 707/741 |

* cited by examiner

*Primary Examiner* — Florian M Zeender
*Assistant Examiner* — Milena Racic
(74) *Attorney, Agent, or Firm* — Rowan TELS LLC (57) ABSTRACT

An inventory management and purchase order system that provides flexible calculation of reorder quantities, based on bounded time interval sales trends, in which multiple such intervals may be configured (compounded) on a per-SKU basis.

6 Claims, 6 Drawing Sheets

JUST IN TIME INVENTORY PROCESS AND FULFILLMENT SYSTEM

CROSS-REFERENCE TO RELATED APPLICATIONS

Not Applicable.

BACKGROUND OF THE INVENTION

Businesses selling via online marketplace platforms (Amazon, eBay, etc.) must manage the purchasing of inventory for various reasons. One major problem these businesses face is maintaining sufficient stock levels. Marketplaces have rules and systems for providing visibility for a merchant's listings. While the algorithms are unpublished, experience shows that merchants who can consistently ship products on demand get better placement, which results in increased sales volume. Running out of stock is undesirable (resulting in days of lost sales) and complicates inventory management, as running out of stock will affect the "momentum" of the SKU long after stock has been replenished.

In conventional inventory management systems, common problems are tying up too much capital in unnecessary inventory holding, and a time-consuming workload for creating purchase orders. Holding more stock per SKU means less funds available for different products.

BRIEF SUMMARY OF THE INVENTION

Embodiments of an inventory management and purchase order system are described that provide flexible calculation of reorder quantities, based on bounded time interval sales trends. Multiple such intervals may be configured (compounded) on a per-SKU basis.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

"Cloud" in this context refers to device resources and process outputs delivered as a service over a network (typically the Internet).

"Database" in this context refers to an organized collection of data (states of matter representing values, symbols, or control signals to device logic), structured typically into tables that comprise 'rows' and 'columns', although this structure is not implemented in every case. One column of a table is often designated a "key" for purposes of creating indexes to rapidly search the database.

"filter" in this context refers to logic for selectively transforming a data set.

"HTTP" in this context refers to (HyperText Transport Protocol) a standard client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET, causes the server to return the document or file located at the specified URL (uniform resource locator).

"JIT" in this context refers to just-in-time inventory management, a 'pull' (demand) driven inventory system in which materials, parts, sub-assemblies, and/or support items are delivered close to a time when needed. JIT systems are utilized for time-based competition and rely on waste reduction, process simplification, setup time and batch size reduction, parallel (instead of sequential) processing, and/or shop floor layout redesign. In JIT systems, shipments are made within configured 'time windows'.

"Module" in this context refers to logic having physical boundaries defined by function or subroutine calls, branch points, application program interfaces (APIs), or other technologies that provide for the partitioning or modularization of particular processing or control functions within a machine. Modules are typically combined via their interfaces with other modules to carry out a machine process.

"PO" in this context refers to purchase order, an electronic document, e.g. file, (or paper document) issued by a buyer to a seller, indicating types, quantities, and agreed prices for products or services.

"SKU" in this context refers to a stock keeping unit. A SKU is a distinct item, such as a product or service, as it is offered for sale that embodies attributes that distinguish it from other items for sale. For a product, these attributes may include, but are not limited to, manufacturer, product description, material, size, color, packaging, and warranty terms. SKU can also refer to a unique identifier or code that refers to the particular stock keeping unit. Herein, SKU is used interchangably with other inventory tracking scemes, such as Universal Product Code (UPC), International Article Number (EAN), and Global Trade Item Number (GTIN).

DESCRIPTION

Described herein are embodiments of order/shipment management logic, which may preferably be "cloud-based", and which is specifically tailored to provide Just-In-Time inventory processes and fulfillment logistics for high volume internet retailers, wholesalers, and marketplace sellers. The system accurately provides a business with accurate restock-quantities to fill customer demand for an upcoming configurable time interval, while holding a substantially minimized inventory necessary per SKU. The system outputs separate purchase orders created simultaneously for multiple vendors. The system utilizes specific outputs generated from unique data sets, combined with restock/purchase order generation logic. The system scales to provide separate Purchase Orders to hundreds of suppliers for thousands of SKUs, providing deep inventory and purchasing management specifically tailored to multiple-channel marketplace sellers (e.g. a business selling on both eBay and Amazon).

The system accurately determines inventory management parameters to predict sales rate and sales acceleration based on historical learning and lead time from suppliers, current shortages, predicted demand, and possibly other factors as well. The system reduces "sputtering" in which a SKU is in stock, then out of stock, then in stock, then out of stock over a short sales interval (weeks or months). The system supports, in an integrated approach, different supply and ordering models, such as order-to-stock and order-to-order, and splitting a single customer order over multiple suppliers.

High volume sales distributed over a large number of different SKUs may enable full automation of purchase-order creation. Signals from the statistical packages, along with user-defined configuration, may be applied to automate the creation and submission of purchase orders to vendors. For example, a user may configure a particular vendor to receive a new order every two weeks. The system then selects SKUs and quantities based on the two week interval, recent sales statistics, and other signals. A purchase order is then configured, and optionally transmitted to the vendor automatically, or presented to a system operator for review, editing, and eventual manual submission to the vendor.

Based on various input signals (historical sales volume, projected volume, vendor lead time, current stock level etc.), daily reports may be generated for employees responsible for purchasing, advising them of imminent out-of-stock conditions, and helping ensure stock is replenished before it runs out.

The system may be utilized by both retail and wholesale operations. The system may communicate purchase orders to vendors that process the PO and generate a pending Sales Order. A vendor may utilize the system to publish an electronic catalog data to customers. This allows the customer to maintain a local version of the vendor's catalog, which allows for new product discovery. After finding a new product, the customer can then "import" that product into their own catalog, assigning it a SKU. Product metadata, image assets, etc., are then imported, and the buyer can add the product to a purchase order, etc.

The wholesaler can review active orders, and update shipping/delivery estimates. The estimate may be transmitted to the buyer's system, where they can provide detailed visibility of inbound stock.

The system supports multi-tenant operation, which is delivering and scaling to multiple customer organizations. In some embodiments the system implementation is "schema-per-customer", maintaining a separate database for each customer. The system utilizes a data-mapping object relational manager, which implements an entity manager, which utilizes a unit-of-work model to provide transactional guarantees for the various, often-complex, processes the system supports. A bootstrap process at the beginning of each HTTP request inspects the request and injects the customer-specific entity manager into the service layer. The system may then operate in a multi-tenant mode without modification to other system components to support multi-tenancy. Exceptions to this mode of operation include non-HTTP-bound requests such as background tasks responsible for fetching orders from sales channels and compiling pre-computed reports, and administrative tasks such as creating a new customer instance and executing schema migrations across a set of customer databases. In these processes, the multi-tenancy module provides a module herein referred to as EntityManagerMulti. This module operates like a single-tenant entity manager, with the added function of selecting a customer database to use. The implementation maintains an internal set of lazy-loaded customer entity managers, and extends the EntityManager interface with a setTenant( ) method that selects a particular customer as "active". Subsequent calls to EntityManager methods are then proxied to the internally-managed, customer-specific instance.

This architecture provides a customer-schema management layer. The management application maintains a database of customer accounts. At it's core, a table maps customer identifiers to a database host and schema name. The individual customer databases may be distributed across a number of database hosts. This enables the system to scale both "up" and "out". High-activity customers can be migrated to their own dedicated database servers, while less-active accounts can be served by a small number of shared database servers.

DRAWINGS

Figure 1:
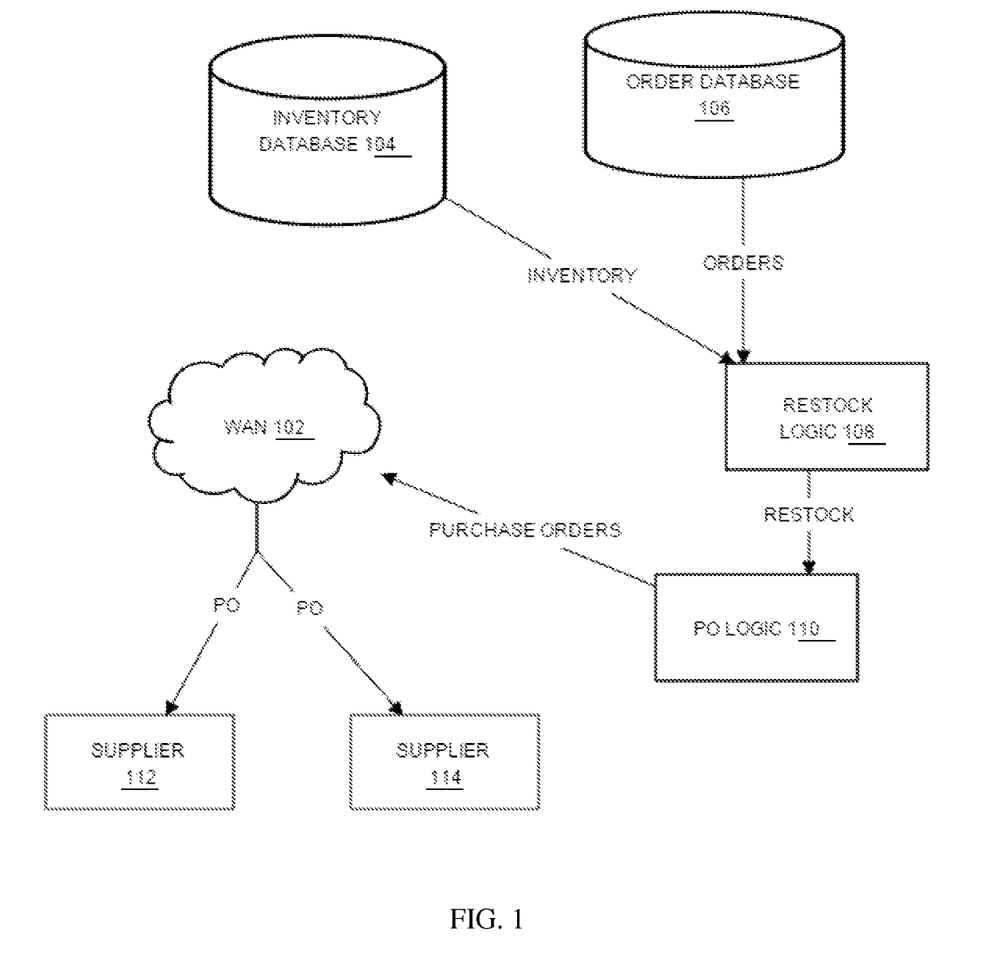
FIG. 1 is a system diagram of an embodiment of a purchase order generation system.
Figure 2:
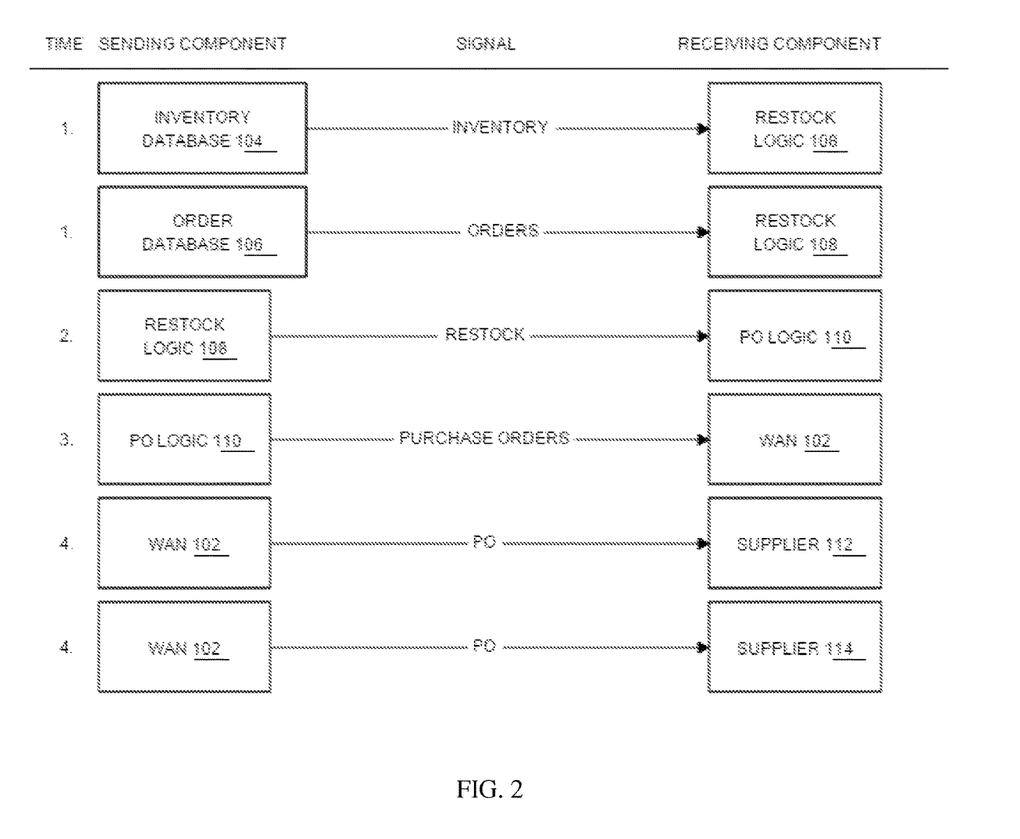
FIG. 2 is an action flow diagram of an embodiment of a purchase order generation process.
Figure 3:
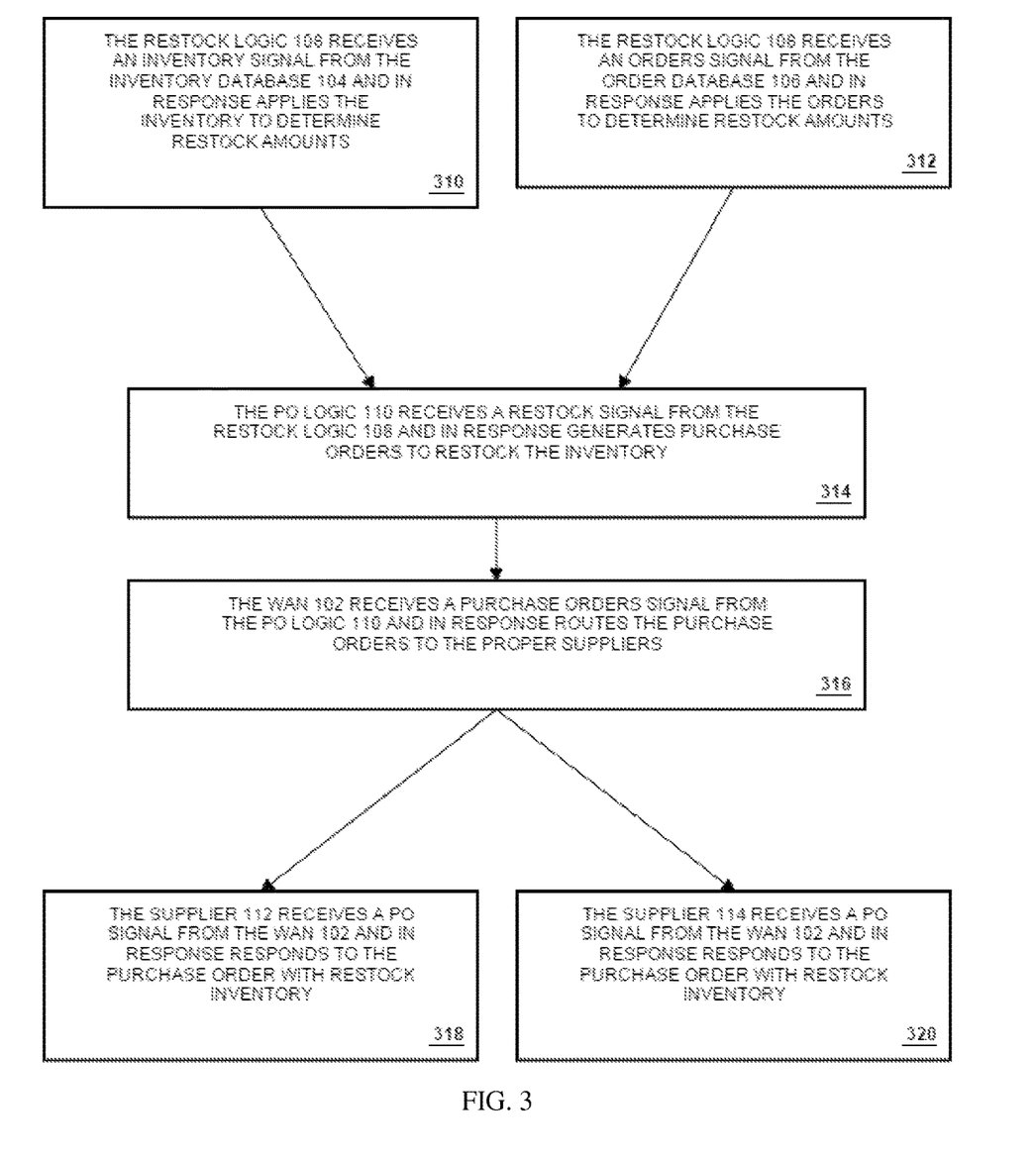
FIG. 3 is a flow chart of an embodiment of a purchase order generation process.

FIG. 1 is a system diagram of an embodiment of a purchase order generation system. FIG. 2 is an action flow diagram of an embodiment of a purchase order generation process. FIG. 3 is a flow chart of an embodiment of a purchase order generation process. Collectively, these figures illustrate a system and processes to carry out the determination of restock quantities and generation of purchase orders for the restock quantities. The system comprises a WAN 102 (wide area network, e.g., the Internet), Inventory database 104, Order Database 106, Restock Logic 108, PO Logic 110, and (in this example) two suppliers, supplier 112, and supplier 114. The Restock Logic 108 receives inventory (a data set from machine memory, configured to represent physical inventor items) from the Inventory database 104 and in response applies a transformation (embodiments of this transformation described herein) to determine restock amounts (310). The Restock Logic 108 receives order data from the Order Database 106 and in response applies a transformation to determine restock amounts (312). The PO Logic 110 receives restock (a data set from machine memory, representing restock quantities and product ids) from the Restock Logic 108 and in response applies a transformation to generate purchase orders to restock the inventory (314).

These purchase orders may be distributed to one or more selected suppliers over a machine network. In the illustrated example, the WAN 102 receives purchase orders from the PO Logic 110 and in response routes the purchase orders to the proper suppliers (316). The supplier 112 and supplier 114 receive the POs from the WAN 102 and in response respond to the purchase order by allocating and shipping restock inventory (320).

Figure 4:
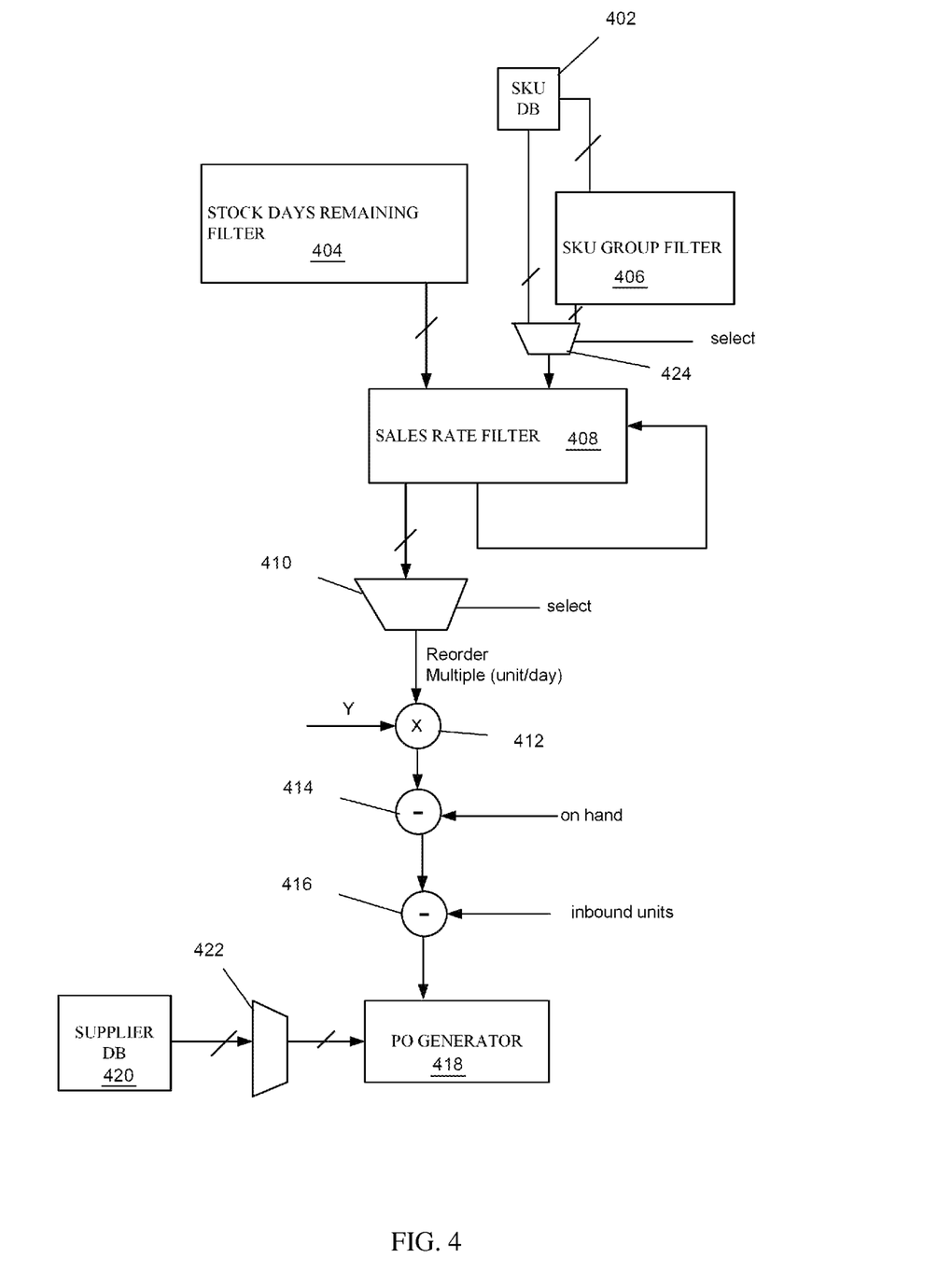
FIG. 4 illustrates an embodiment of a restock determination and purchase order generation system

FIG. 4 illustrates an embodiment of a restock determination and purchase order generation system. A SKU database 402 provides a source of SKUs, which may be filtered 406 by title/type/category into SKU groups. For example, a filter may be applied to create a SKU group for all iPhone 6 accessories. SKUs, or a filtered SKU group, are selected 424 for input to a sales rate filter 408.

SKUs may be filtered for a number of stock days X remaining 404 at a current sales rate volume. This generates a set of SKUs that have under X days of inventory on hand at a current Y day sales rate.

The system may apply compound filtering by applying a minimum sales volume number(s) for a configured sales interval (days, weeks, etc.) This produces a set of SKUs having units sold per day (or some other configured sales interval) greater than or equal to the applied minimum. For example, the system may apply (e.g., under user control) X=6 units and Y=3 days, compounded with X=24 units and Y=14 days. This will produce a filtered set of SKUs selling a minimum of 6 units in 3 days and a minimum of 24 units in 14 days. Another example is to filter a set of SKUs that sell a minimum 21 units per week and have done so do for the last 3 months. In this case, the system applies X=21 units and Y=7 days, and X=270 units and Y=90 days. The set of SKUs generated would be those having a solid recent sales history, and thus SKUs that should be prioritized for keeping in stock. The facility of compounding sales rates to produce a SKU set is illustrated by the feedback path to sales rate filter 408.

A selector 410 is applied to specify an X,Y filter to apply as a reorder multiple for a recommended reorder quantity determination. The reorder quantity is based on a unit per-day (or other interval) sale rate (the reorder multiple) for a previous X days (e.g., 3) multiplied 412 by a number of days Y (e.g., 60) days. The recommended reorder quantity will top-up inventory to Y days worth of stock (at the X day sales rate). For example, the system may calculate a reorder quantity as follows: 10 units sold in 3 days=3.333/day 3.333/day*60 days=200 units. The system may then subtract 414 a quantity of stock already in inventory ("on hand"). For example, 200−93 (on hand)=107. If there are any units of stock inbound (ordered but not yet received), the system may subtract 416 these units before outputting the recommended reorder quantities. In one embodiment, generation and sending of POs will cause the sent POs to be marked as sent, and the system will count any inventory attached to the PO as "inbound" for purposes of restock calculation. The system may revise, remove, or round the recommended reorder quantities as configured to do so.

Suppliers to provide the reorder quantities are selected 422, based on the SKUs, from a supplier database 420. The reorder quantities and selected suppliers are applied to a purchase order generator 418 to produce POs for the reordered SKUs.

The system provides a facility for identifying products (SKUs) that are experiencing accelerating sales volume. The sales rate filter 408 may be operated to identify "fast movers" comprising SKUs having a sales volume that has undergone a recent (a defined time interval) increase beyond a threshold level. For example, the system may compare consecutive 3-day sales volume (1-3 days ago compared 4-6 days ago), and consecutive 7-day sales volume (comparing the past seven days volume to that of the preceding seven days). The comparison values are then combined in configurable proportions to derive an acceleration metric. This metric will identify SKUs experiencing strong, short-term sales growth. An estimated reorder quantity that accounts for projected growth in sales may then be derived from the acceleration metric.

The fast mover analysis may be augmented with predictions based on similar historical products. SKUs may have attributes attached. If one SKU shares many attributes with another SKU that has been in the marketplace for longer (for instance: a new color of an existing model cell-phone case), the system estimates future sales volume of the new product based on past performance of the older, but similar, product.

A corpus of vendor performance may be configured over time. In one embodiment, the PO generator logic 418 may track 1) a date at which a PO is submitted to a vendor, 2) the vendor's stated estimate for delivery, and 3) an actual delivery date(s) for the order. This data may be transformed into estimates of future vendor performance, which may include a confidence score representative of the vendors' ability to accurately estimate delivery. The estimate/confidence score may be applied to the selector 422 from the supplier database 420 to influence the vendor-selection process.

Figure 5:
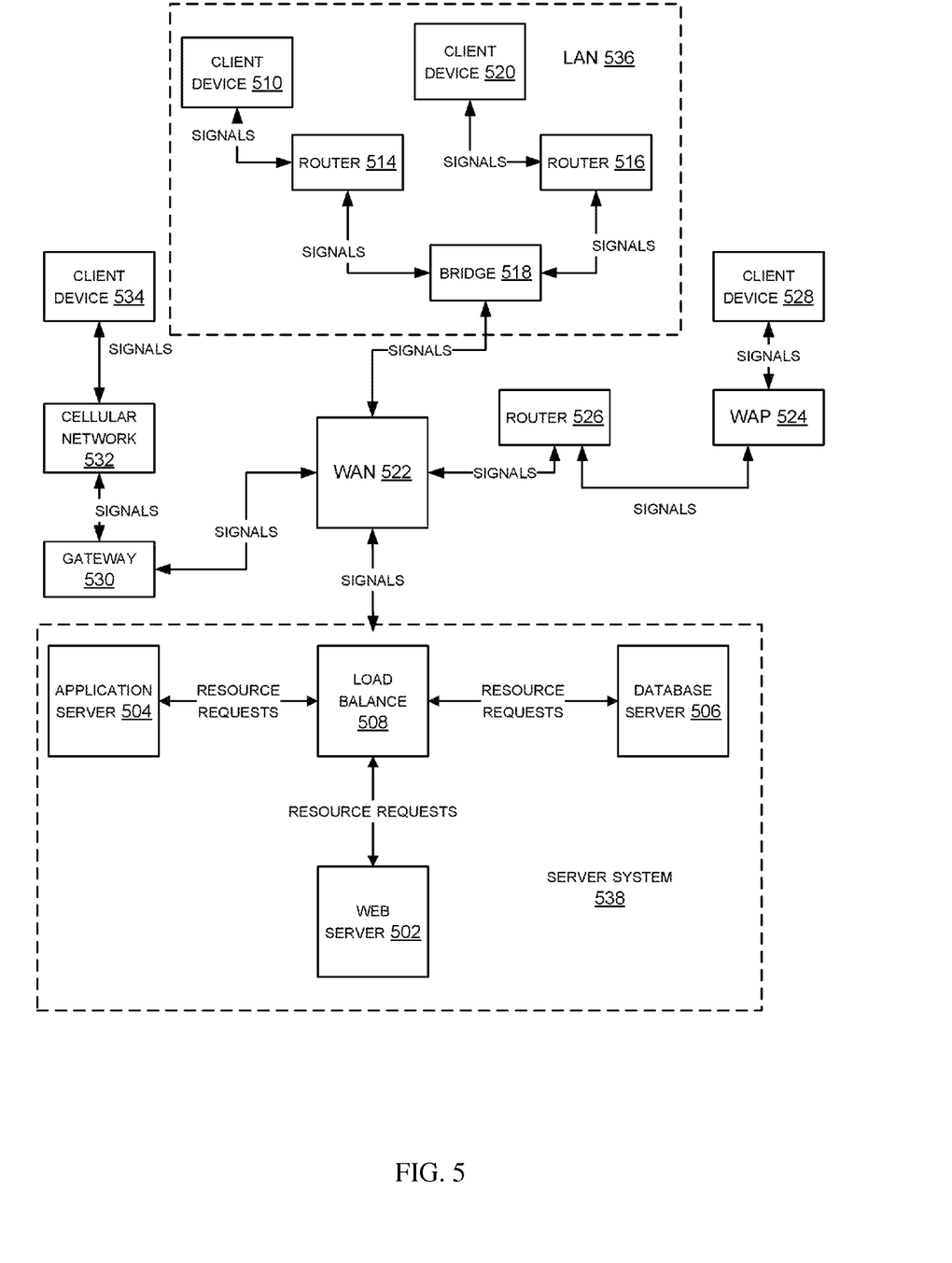
FIG. 5 illustrates a machine system that may implement an embodiment of an inventory reorder and purchase order generation system.

FIG. 5 illustrates a machine system that may implement an embodiment of an inventory reorder and purchase order generation system. Several network access technologies between client devices and server resources are illustrated, including cellular network 532, LAN 536, and WAP 524. Signals representing server resource requests are output from client devices 510, 520, 528, and 534 to the various access networks, from which they are propagated to a WAN 522 (e.g., the Internet) and from there to a server system. These signals are typically encoded into standard protocols such as Internet Protocol (IP), TCP/IP, and HTTP. When the clients are part of a LAN 536, the signals may be propagated via one or more router 514 516 and a bridge 518. A router 526 may propagate signals from the WAP 524 to the WAN 522. A gateway 530 may propagate signals from the cellular network 532 to the WAN 522. The server system 538 in this example comprises a number of separate server devices, typically each implemented in the separated machine, although this is not necessarily the case. The signals from the client devices are provided via a load balancing server 508 to one or more application server 504 and one or more database server 516. Load balancing server 508 maintains an even load distribution to the other server, including web server 502, application server 504, and database server 506. Each server in the drawing may represent in effect multiple servers of that type. The load balancing server 508, application server 504, and database server 506 may collectively implement an embodiment of the system described herein. The signals applied to the database server 506 may cause the database server 506 to access and certain memory addresses, which correlates to certain rows and columns in a memory device. These signals from the database server 506 may also be applied to application server 504 via the load balancing server 508. Signals applied by the application server 504, via the load balancing server 508, to the web server 502, may result in web page modifications which are in turn communicated to a client device, as described herein in regards to user interface and interaction signals to and from a client device. The system described herein may thus be implemented as devices coordinated on a LAN, or over a wide geographical area utilizing a WAN or cellular network, or over a limited area (room or house or store/bar) utilizing a WAP. Features of client logic to interact with the described system may thus be implemented, for example, as an application (app) on a mobile phone interfacing to a network in one of the manners illustrated in this figure. The system described herein may be implemented as a pure or hybrid peer to peer system in a local or widely distributed area.

Figure 6:
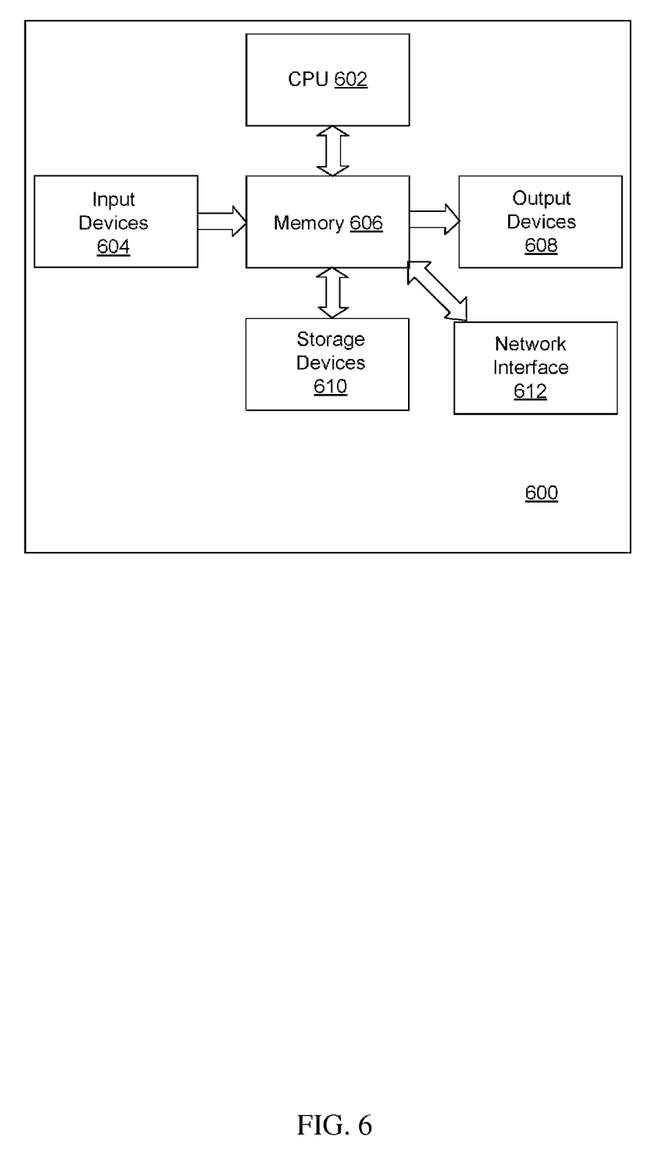
FIG. 6 illustrates a machine which can implement various features described herein (e.g., a reorder logic device and/or a purchase order generation device).

FIG. 6 illustrates a machine which can implement various features described herein (e.g., a reorder logic device and/or a purchase order generation device). Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory devices 606. The memory devices 606 is typically what is known as a first or second level memory device, providing for storage (via configuration of matter or states of matter) of signals received from the input devices 604, instructions and information for controlling operation of the CPU 602, and signals from storage devices 610. Information stored in the memory devices 606 is typically directly accessible to processing logic 602 of the device. Signals input to the device cause the reconfiguration of the internal material/energy state of the memory device 606, creating in essence a new machine configuration, influencing the behavior of the device 600 by affecting the behavior of the CPU 602 with control signals (instructions) and data provided in conjunction with the control signals. Second or third level storage devices 610 may provide a slower but higher capacity machine memory capability. Examples of storage devices 610 are hard disks, optical disks, large capacity flash memories or other non-volatile memory technologies, and magnetic memories. The processing logic 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory of 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile. Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers). Communication interface 612 receives signals from the memory 606 and converts them into electrical, optical, or wireless signals to other machines, typically via a machine network. Communication interface 612 also receives signals from the machine network and converts them into electrical, optical, or wireless signals to the memory 606.

Embodiments of an inventory restocking system have been described. The following claims are directed to said embodiments, but do not preempt or encompass restocking or inventory management in the abstract. Those having skill in the art will recognize numerous other approaches to inventory management, restock determination, and purchase ordering are possible and/or utilized commercially, and which do not utilize the inventive processes and specific interaction of those processes of the claims as an integrated whole, thus precluding any possibility of preemption or encompassing of these activities in the abstract. The claimed system is not only configured for non-trivial and unconventional processing, it also improves, in one or more specific ways, the operation of a machine system for inventory restock determination and application, and thus distinguishes from other approaches to the same problem/process in how its physical arrangement of a machine system determines the system's operation and ultimate effects on the material environment. Although that any system, process, apparatus or material may ultimately, with enough intellectual reduction, be reduced to basic or fundamental components (e.g., a computer may be reduced to circuits and conductors, a new medicine reduced to known atoms, etc.), described herein are novel and inventive configurations and interoperations of any such components to enable and implement novel and inventive devices and systems of devices that specifically improve the functioning of an inventory restocking machine system. The claims are not a mere general linking of an abstract idea to a technology environment, and require more than a generic computer performing generic functions that are well understood and routine and conventional, and previously known to the industry.

It will be further recognized that the claims do not preempt or wholly encompass any fundamental economic practice, idea in and of itself (e.g., a principle, original cause, or motive), or pure mathematical formula or relationship.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method of generating a digital file comprising an amount of unordered stock, the method comprising:
   receiving an HTTP request for the digital file at a multi-tenant database machine system;
   executing a bootstrap process at the beginning of the HTTP request to inspect the request and inject a customer-specific entity manager into a service layer of the multi-tenant database machine system; and
   operating the customer-specific entity manager to:
      receive a stock-keeping unit information from a stock-keeping unit database, wherein the stock-keeping unit information comprises at least one sales rate and at least one time interval for at least one stock-keeping unit;
      filter the stock-keeping unit information via a first filter, wherein the first filter filters the stock-keeping unit information based on a first sales rate from the at least one sales rate and a first time interval from the at least one time interval;
      modify the first filter via a first selector, wherein the first selector is operated by a first control logic, and the first control logic determines the first sales rate and the first time interval;
      determine a target stock level via a multiplier applied to an output of the first filter;
      determine an amount of unavailable stock via a first level adjuster operated on the target stock level;
      determine the amount of unordered stock via a second level adjuster operated on the amount of unavailable stock; and
      generate the digital file comprising the amount of unordered stock.

2. The method of claim 1 wherein the first filter further filters the stock-keeping unit information based on a second sales rate from the at least one sales rate and a second time interval from the at least one time interval, the second sales rate and the second time interval are determined by the first control logic.

3. A computing apparatus, the computing apparatus comprising:
- a processor; and
- a memory storing instructions that, when executed by the processor, configure the apparatus to:
  - receive an HTTP request for the digital file at a multi-tenant database machine system;
  - execute a bootstrap process at the beginning of the HTTP request to inspect the request and inject a customer-specific entity manager into a service layer of the multi-tenant database machine system; and
  - operate the customer-specific entity manager to:
    - receive a stock-keeping unit information from a stock-keeping unit database, wherein the stock-keeping unit information comprises at least one sales rate and at least one time interval for at least one stock-keeping unit;
    - filter the stock-keeping unit information via a first filter, wherein the first filter filters the stock-keeping unit information based on a first sales rate from the at least one sales rate and a first time interval from the at least one time interval;
    - modify the first filter via a first selector, wherein the first selector is operated by a first control logic, and the first control logic determines the first sales rate and the first time interval;
    - determine a target stock level via a multiplier on the output of the first filter;
    - determine an amount of unavailable stock via a first level adjuster operated on the target stock level;
    - determine an amount of unordered stock via a second level adjuster operated on the amount of unavailable stock; and
    - generate a digital file comprising the amount of unordered stock.

4. The computing apparatus of claim 3 wherein the first filter further filters the stock-keeping unit information based on a second sales rate from the at least one sales rate and a second time interval from the at least one time interval, the second sales rate and the second time interval are determined by the first control logic.

5. A non-volatile machine-readable medium comprising instructions that when applied to one or more computer processor, configure the one or more computer processor to:
- receive an HTTP request for the digital file at a multi-tenant database machine system;
- execute a bootstrap process at the beginning of the HTTP request to inspect the request and inject a customer-specific entity manager into a service layer of the multi-tenant database machine system; and
- operate the customer-specific entity manager to:
  - receive a stock-keeping unit information from a stock-keeping unit database, wherein the stock-keeping unit information comprises at least one sales rate and at least one time interval for at least one stock-keeping unit;
  - filter the stock-keeping unit information via a first filter, wherein the first filter filters the stock-keeping unit information based on a first sales rate from the at least one sales rate and a first time interval from the at least one time interval;
  - modify the first filter via a first selector, wherein the first selector is operated by a first control logic, and the first control logic determines the first sales rate and the first time interval;
  - determine a target stock level via a multiplier applied to an output of the first filter;
  - determine an amount of unavailable stock via a first level adjuster operated on the target stock level;
  - determine the amount of unordered stock via a second level adjuster operated on the amount of unavailable stock; and
  - generate a digital file comprising the amount of unordered stock.

6. The non-volatile machine-readable medium of claim 5, wherein the instructions when applied to one or more computer processor, further configure the one or more computer processor to:
- further filter the stock-keeping unit information based on a second sales rate from the at least one sales rate and a second time interval from the at least one time interval, the second sales rate and the second time interval are determined by the first control logic.

* * * * *